June 12, 1962   J. B. CHATTERTON   3,039,042
SHIELDING OF TRANSFORMERS
Filed Feb. 12, 1959   2 Sheets-Sheet 1

INVENTOR.
JOHN B. CHATTERTON
BY
Brumbaugh, Free, Graves + Donohue
his ATTORNEYS

June 12, 1962   J. B. CHATTERTON   3,039,042
SHIELDING OF TRANSFORMERS
Filed Feb. 12, 1959   2 Sheets-Sheet 2
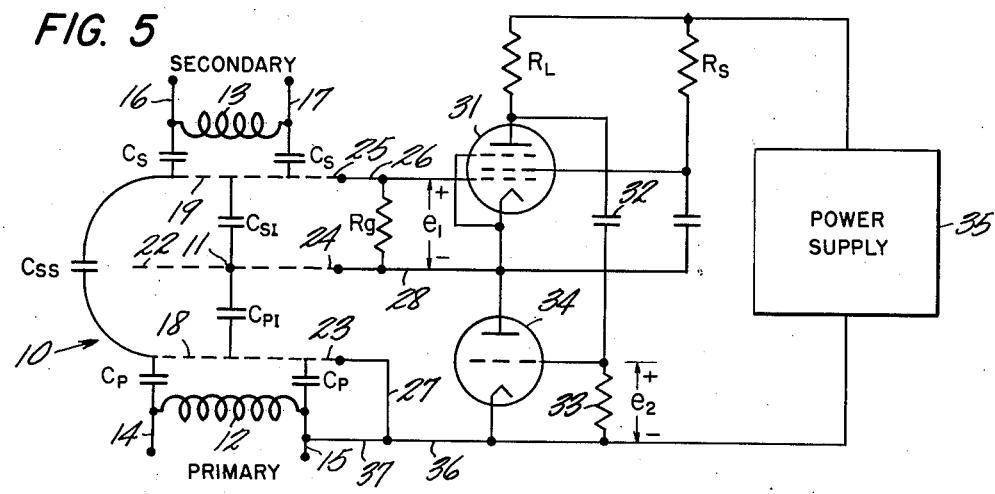
FIG. 5
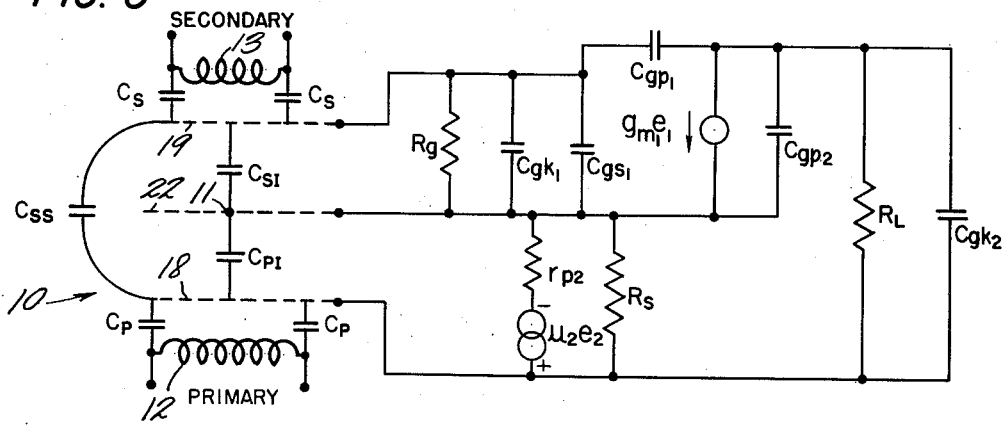
FIG. 6
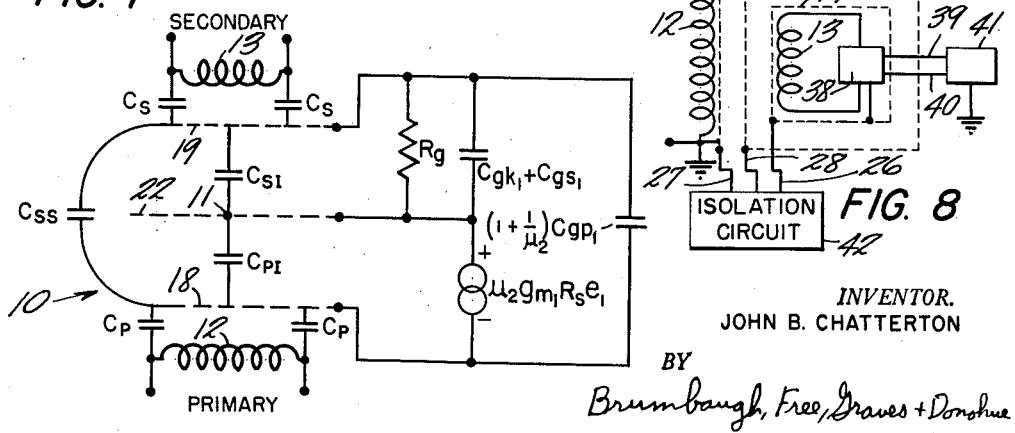
FIG. 7
FIG. 8
INVENTOR.
JOHN B. CHATTERTON
BY
Brumbaugh, Free, Graves + Donohue
his ATTORNEYS.

United States Patent Office 3,039,042
Patented June 12, 1962

3,039,042
SHIELDING OF TRANSFORMERS
John B. Chatterton, Garden City, N.Y., assignor to Moeller Instrument Company, Richmond Hill, N.Y., a corporation of New York
Filed Feb. 12, 1959, Ser. No. 792,833
6 Claims. (Cl. 323—44)

This application relates to electrostatic shielding of transformers and, more particularly, to the reduction of capacitive coupling between transformer windings.

The isolation between primary and secondary circuits of transformers, while sufficient for many purposes, is inadequate when transformer energized circuits are used to energize sensitive electrical devices directly or indirectly grounded at one or more points. Thus, the capacitive coupling between the primary and secondary windings, especially due to capacitance between the windings and core, results in the flow of currents relatively low in magnitude but nevertheless destructive to accuracy of such sensitive devices.

In particular, in transformers the coupling capacitances between the primary winding and the iron core, and the iron core and the secondary winding are in series. Ordinarily one side of the primary is grounded so that if a direct or indirect ground occurs in the secondary circuit, voltage across the primary winding causes core current to flow through such coupling capacitances and one side of the secondary circuit to ground. Since such secondary circuit ground normally is found in a device connected to the transformer secondary winding, such core current interferes with accurate operation of such device. Moreover, the primary voltage also causes winding to winding current to flow through the capacitance between the primary and secondary windings under similar conditions.

Various expedients have been suggested to minimize the capacitances between the transformer core and windings, thereby reducing coupling between the primary and secondary windings. For example, grounding the core eliminates flow of the core current as a result of primary voltage while effective electrostatic shielding between the primary and secondary windings reduces winding to winding currents. However, capacitive coupling to the common ground remains so that with one side of the secondary circuit grounded, the secondary voltage causes current to flow through the capacitances between the secondary winding and the grounded core. Therefore, the transformer secondary circuit is not really isolated from the power line.

Other arrangements to reduce capacitive coupling between transformer primary and secondary windings have included balanced capacitances in a bridge circuit. Such circuits are difficult to set up and, in addition, must be readjusted periodically.

The present invention provides effective electrostatic shielding of transformers and isolation of the secondary winding from any circuit such as a power line connected to the primary winding by splitting the core to winding coupling capacitances into winding to shield and shield to core capacitances. One of the two series connected shield to core capacitances is then reduced to a negligible value to render capacitive coupling between the secondary and primary windings negligible.

To achieve such capacitance reduction, electrostatic shields are disposed to isolate the primary and secondary windings from the core and a suitable electronic isolation circuit connected to the shields and core and responsive to voltage between the core and one of the primary and secondary shields to reduce one of two series capacitances to a negligible value. The primary shield to secondary shield capacitance may be minimized by spacing the windings sufficiently apart on the core. In addition, a further shield connected to the core may be employed to reduce shield to shield capacitance when sufficient spacing of the windings is not possible, or such further shield may be used in combination with the spaced transformer windings to reduce stray capacitance to even lower values.

These and further advantages of the invention will be more readily understood when the following description is read in connection with the accompanying drawings, in which:

FIGURE 5 is a schematic circuit diagram of an illustrative circuit incorporating the transformer of FIGURE 1 to reduce capacitive coupling between the transformer primary and secondary windings in accordance with the principles of the present invention;

FIGURE 6 is an equivalent circuit of the schematic of FIGURE 5;

FIGURE 7 is a simplified approximate equivalent circuit of the circuit shown in FIGURE 6; and FIGURE 8 is a schematic circuit diagram, partially in block form, of a circuit incorporating the principles of the present invention.

Figure 1:
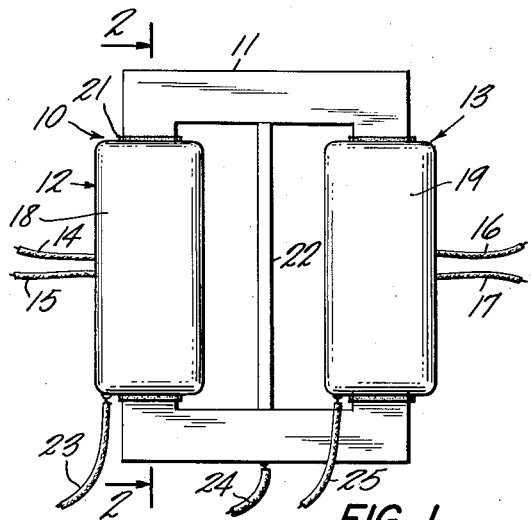
FIGURE 1 is an elevation of a transformer embodying the principles of the present invention.
Figure 2:
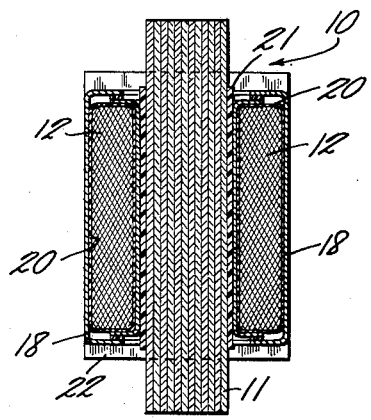
FIGURE 2 is a longitudinal section of the transformer illustrated in FIGURE 1 taken along the view line 2—2 looking in the direction of the arrows.

Referring to an illustrative embodiment of the invention in greater detail with particular reference to FIGURES 1 and 2, a transformer 10 is formed of a laminated iron core 11 carrying primary and secondary windings 12 and 13 on its opposite legs. Input and output conductors 14, 15 and 16, 17 are connected to the primary and secondary windings 12 and 13, respectively.

To shield the primary and secondary windings 12 and 13 electrostatically from the iron core 11, and thereby split the capacitances between these elements, copper foil shields 18 and 19 are wrapped on the windings 12 and 13 without providing a shorted turn about the iron core 11. Insulation layers 20 and 21 are preferably disposed between the primary shield 18 and winding 12, and the shield 18 and iron core 11. Similar insulation (not shown in detail) may also be employed between the secondary shield and winding, and the secondary shield and core.

The core 11 may be formed to space the primary and secondary windings 12 and 13 a sufficient distance apart to provide negligible stray capacitance between the primary and secondary shields 18 and 19. If such spacing is inconvenient, or if stray capacitance should be further reduced, a shield 22 extending laterally a sufficient distance to shield the primary and secondary shields 18 and 19 may be fitted into the aperture of the iron core 11 and joined electrically thereto. Leads 23, 24 and 25 are respectively joined to the primary shield 18, the core 11 and the secondary shield 19, and lead to an isolation circuit to be described in detail below.

Figure 3:
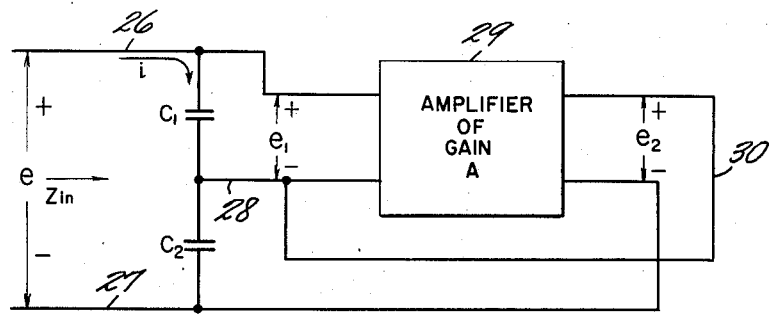
FIGURE 3 is a schematic circuit diagram of a circuit useful in explaining the present invention.

Referring next to the circuit shown in FIGURE 3, a pair of leads 26 and 27 are joined by a pair of series connected capacitors $C_1$ and $C_2$. A further conductor 28 connects the junction of the capacitors to an amplifier 29 of gain A having an output lead 30 returning to the lead 28. Assuming the application of a voltage $e$ across the leads 26 and 27, and input and output voltages $e_1$ and $e_2$ at the amplifier 29 of gain A, then $$e=e_1+e_2=e_1+Ae_1$$
$$e=iX_{C1}+AiX_{C1}$$
(1) $\quad e=i(1+A)X_{C1}$ When gain A is much greater than 1, $$Z_{in}=\frac{e}{i}=(1+A)X_{C1}$$
$$Z_{in}\approx AX_{C1}$$
(2) $\quad Z_{in}=\frac{A}{j\omega C_1}=\frac{1}{j\omega(C_{1/A})}$ where $Z_{in}$ is the input impedance.

It is apparent from Formula 2 that the effective input capacitance to any driving voltage $e$ for the circuit of FIGURE 3 will be $C_{1/A}$ which can be made extremely small by making A large.

Figure 4:
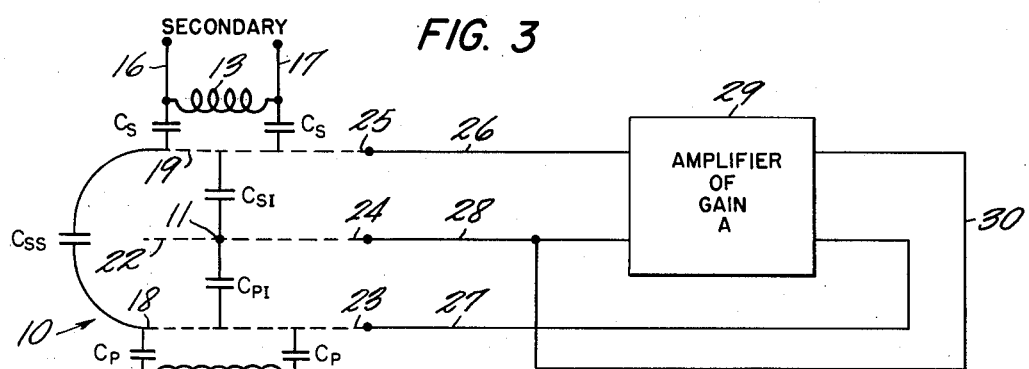
FIGURE 4 is a schematic circuit diagram showing the transformer of FIGURE 1 connected in the circuit of FIGURE 3 in accordance with the invention.

Examining FIGURE 4, a schematic representation of the transformer 10 of FIGURES 1 and 2 illustrates clearly the various capacitances with the shields in place. In particular, the primary winding to core capacitances is split into capacitances $C_P$ between the primary winding and shield 18 and $C_{PI}$ between the shield 18 and the core. Similarly, the secondary winding to core capacitance is split into $C_S$ and $C_{SI}$ by the shield 19. The capacitors $C_{PI}$ and $C_{SI}$ represent respectively the capacitances between the primary winding shield 18 and the iron core 11 and the secondary shield 19 and the core, while $C_{SS}$ represents the insignificant stray capacitance between primary and secondary shields 18 and 19.

If one side of the primary were grounded and one side of the secondary were connected directly or indirectly to ground in the conventional manner, application of a voltage to the primary winding 12, absent the below-described circuits, would result in current flow through the capacitors $C_P$, $C_{PI}$, $C_{SI}$, $C_S$ and the secondary circuit to ground. Current flow through the small stray capacitance $C_{SS}$ would be negligible due to the spacing of the shields 18 and 19, and the shield 22 interposed between those shields.

To reduce coupling between the primary and secondary windings of the transformer 10 caused by such current flow, the isolation circuit including the amplifier 29 is connected by the leads 26, 28 and 27 to the shield leads 25, 24 and 23, respectively. Accordingly, the capacitance seen by any driving voltage across the series connected capacitors $C_{PI}$ and $C_{SI}$ will be reduced to $C_{SI/A}$ in accordance with Formula 2 and the coupling between the windings reduced to a negligible value since A is large. The leads 26 and 27 may be reversed in which event the effective coupling capacitance would be $C_{PI/A}$.

If the isolation circuits are powered by line voltage obtained from the same source that supplies the transformer 10, it is possible for coupling to occur through the amplifier 29 since it shunts the transformer 10. To overcome such effects the circuit shown in FIGURE 5 may be utilized. The input conductors 26 and 28 apply voltage $e_1$, the voltage between the secondary shield and core, to the input circuit of a pentode 31 provided with a grid resistor $R_g$. A load resistor $R_L$ and a screen resistor $R_S$ are suitably chosen to supply proper operating potentials to the pentode. A feedback capacitor 32 couples the pentode output to an input resistor 33 to provide voltage $e_2$ at the grid circuit of a triode 34. The filaments of the pentode 31 and triode 34 can be sufficiently well shielded in unipotential cathodes to provide inconsequential coupling.

The isolation circuits of FIGURE 5 are energized by a power supply 35 connected through the conductors 36 and 37 to the ground side of the power line, indicated in this instance as the input conductor 15 of the transformer 10.

An equivalent circuit of the feedback amplifier circuits of FIGURE 5 has been shown in FIGURE 6. Since both $R_S$ and $R_L$ are much greater than $r_{p2}$, and with other obvious inequalities, the approximate equivalent circuit of FIGURE 6 may be substituted for the circuit of FIGURE 6.

The coefficient of $e_1$ shown in FIGURE 7 is equivalent to the total gain A, as explained in connection with FIGURE 3. Therefore, the total effective impedance coupling between the transformer primary and secondary windings is $$Z_{total}=\frac{1}{Y_{total}}$$

(3)
$$Z_t=\cfrac{1}{j\omega\left[\left(1+\cfrac{1}{\mu_2}\right)C_{gp_1}+C_{ss}\right]+\cfrac{1}{j\omega\left[\cfrac{C_{s_1}+C_{gk_1}+C_{gs_1}}{\mu_2 g_{m_1}R_s}\right]}+\mu_2 g_{m_1}R_sR_g}$$

Illustrative values of the quantities indicated in Formula 3 are as follows:

$C_{ss}$—shield to shield stray capacitance of the transformer—1 mmf.

$C_{gp_1}$—grid to plate capacitance of the pentode 31—.005 mmf.

$C_{s_1}$—secondary shield to core capacitance of the transformer—300 mmf.

$C_{gk_1}$—grid to cathode capacitance of the pentode 31—5 mmf.

$C_{gs_1}$—grid to screen capacitance of the pentode 31—2 mmf.

$R_g$—grid leak value of the pentode 31—$40 \times 10^6$ ohms.

$\mu_2 g_{m_1}R_s$—gain A—1000.

$\mu_2$—amplification factor of the triode 34—50.

Substituting the illustrative values set forth above in Formula 3, it will be found that the total impedance between the primary and secondary windings consists of a capacitance of about 1 mmf. in parallel with a resistance of about $40 \times 10^9$ ohms. It should be noted that this value compares with a capacitance coupling of 400 to 1000 mmf. and a leakage resistance of $10^{10}$ to $50 \times 10^9$ ohms in the best conventional shielded transformer.

FIGURE 8 illustrates a circuit using a shielded transformer and isolation circuit in accordance with the present invention. The transformer secondary winding 13 is connected in circuit with rectifier and regulator circuits 38 to provide D.-C. potential on lines 39 and 40 leading to an instrument 41. The secondary shield 19 is extended to shield the entire secondary circuit including the rectifier and regulator circuits 38, and the core shield 22 is also extended around secondary shield 19 to minimize stray capacitance. In the event that the output conductors 39 and 40 must be extended some distance, the shields 19 and 22, and also the shield 18, may be extended to surround such output leads.

The input conductors 26, 28 and 27 of the isolation circuit incorporating the circuits of FIGURE 4 or 5 are respectively connected to the secondary shield 19, the core shield 22 and the primary shield 18. With this arrangement, the primary shield 18 may be grounded and the chassis mounting the rectifiers and regulators 28 joined to the shield 19 without increasing the coupling between transformer windings. In fact, grounding of the chassis mounting the rectifier circuits 38 would not affect the coupling adversely. The instrument 41, which may for example comprise a strain gauge bridge requiring D.-C. power, may then be grounded directly or indirectly, as indicated, without having its operation affected by coupling currents due to the reduction of capacitive coupling to the secondary circuits to a negligible value.

It is apparent from the foregoing that the inventive concepts may be used to shield a wide variety of transformers in which reduction of the capacitive coupling between transformer windings is especially desirable.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. Transformer shielding apparatus comprising a transformer having primary and secondary windings on a core, a primary shield electrostatically isolating the primary winding from the core, a secondary shield electrostatically isolating the secondary winding from the core, whereby primary shield to core capacitance and secondary shield to core capacitance are provided in series, and electric circuit means connected to the shields and core and responsive to voltage between the core and one of the primary and secondary shields to reduce the series capacitance between the shields to a negligible value to minimize capacitive coupling between the transformer windings.

2. Apparatus as defined in claim 1, in which a further shield electrically connected to the core is interposed between the primary and secondary shields to minimize stray capacitance therebetween.

3. Transformer shielding apparatus comprising a transformer having primary and secondary windings on a core, a primary shield electrostatically isolating the primary winding from the core, a secondary shield electrostatically isolating the secondary winding from the core, whereby primary shield to core capacitances and secondary shield to core capacitances are provided in series, and isolation circuits including feedback amplifier circuits connected to the core and the primary and secondary shields and responsive to voltage between the core and one of the primary and secondary shields to reduce the capacitance between the shields to a negligible value to minimize capacitive coupling between the transformer windings.

4. Apparatus as defined in claim 3, in which a shield electrically connected to the core is interposed between the primary and secondary shields to minimize stray capacitance therebetween.

5. Transformer shielding apparatus comprising a transformer having primary and secondary windings on a core, a primary shield electrostatically isolating the primary winding from the core, a secondary shield electrostatically isolating the secondary winding from the core, whereby primary shield to core capacitance and secondary shield to core capacitance are provided in series, isolation circuits including feedback amplifier circuits having an input circuit connected to the core and one of the primary and secondary winding shields to reduce the capacitance between the one shield and the core to a negligible value, the other of the primary and secondary winding shields being connected to the isolation circuits, and means in the input circuit effectively reducing capacitive coupling between the primary and secondary shields through the feedback amplifier circuits to minimize capacitive coupling between the transformer windings.

6. Apparatus as defined in claim 5, in which a shield electrically connected to the core is interposed between the primary and secondary shields to minimize stray capacitance therebetween.

References Cited in the file of this patent

UNITED STATES PATENTS

| | | |
|---|---|---|
| 2,668,911 | Schlesinger | Feb. 9, 1954 |
| 2,878,441 | Rodgers et al. | Mar. 17, 1959 |